4 Sheets—Sheet 1.

D. REYNOLDS.

Type Distributing Machine.

No. 9,560. Reissued Feb. 8, 1881.

Witnesses:

Charles Duckin

Richard P. Dumay

Dexter Reynolds

Inventor.

by his attorney

Alex. Delkirk

D. REYNOLDS.

Type Distributing Machine.

No. 9,560. Reissued Feb. 8, 1881.

Witnesses.
Charles Eckink
Richard P. Dumary

Dexter Reynolds
Inventor.
by his atty
Alex. Eckink

4 Sheets—Sheet 3.

D. REYNOLDS.

Type Distributing Machine.

No. 9,560. Reissued Feb. 8, 1881.

Witnesses.

Charles Burnett

Richard P. Dumary

Dexter Reynolds

Inventor by his Attorney

Alex. Selkirk.

D. REYNOLDS.

Type Distributing Machine.

No. 9,560. Reissued Feb. 8, 1881.

Witnesses.
Charles Selkirk
Richard P. Dumary

Dexter Reynolds
Inventor.
by his attorney
Alex Selkirk

UNITED STATES PATENT OFFICE.

DEXTER REYNOLDS, OF ALBANY, NEW YORK.

TYPE-DISTRIBUTING MACHINE.

SPECIFICATION forming part of Reissued Letters Patent No. 9,560, dated February 8, 1881.

Original No. 192,281, dated June 19, 1877. Application for reissue filed June 28, 1880.

*To all whom it may concern:*

Be it known that I, DEXTER REYNOLDS, of the city and county of Albany and State of New York, have invented certain new and useful Improvements in Type-Distributing Machinery, of which the following is a specification.

My invention relates to the automatic distribution of types provided with nicks for subsequent use in type-setting machines.

The object of my invention is the construction of a machine for distributing type having a series of channels constructed to receive in lines (instead of single letters at a time) the type intended for distribution, in combination with a series of channels constructed to receive and provided with fixed pins to separate the type as they are passed from the former series of channels, the two series being so constructed and arranged with reference to each other that by an intermittent movement given to one past the other in each passage of the one past the other every channel of the one shall become coincident with every channel of the other. I attain these objects by the mechanism illustrated in the accompanying drawings, in which—

Figure 1:
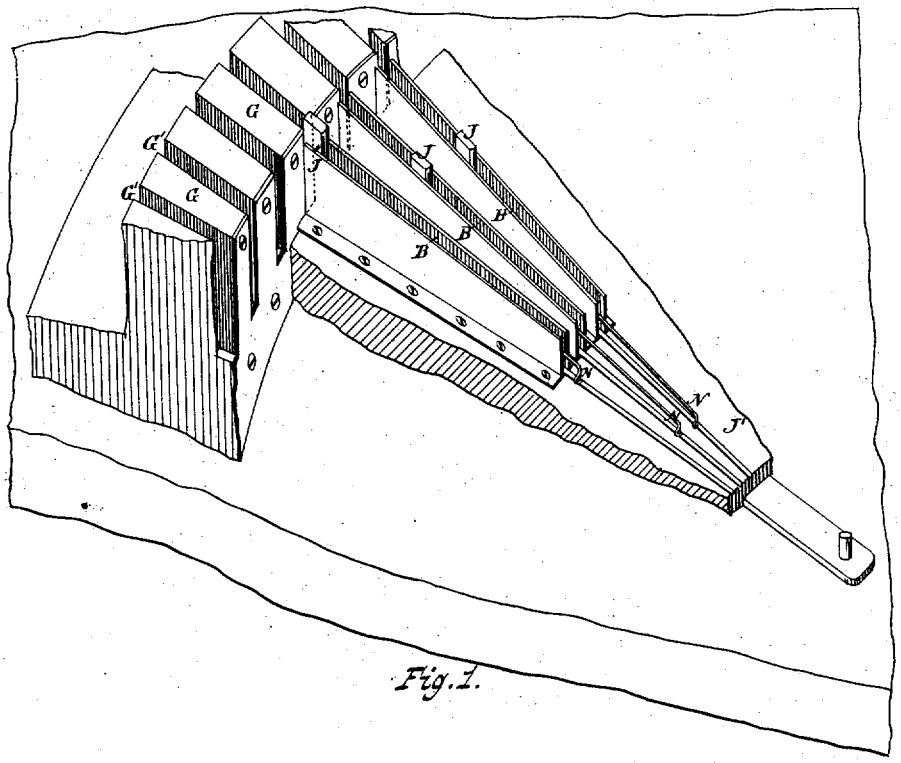
Figure 2:
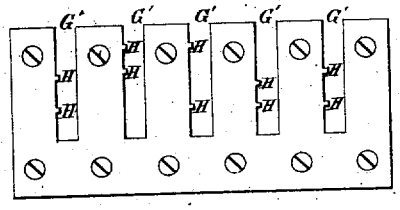
Figure 3:
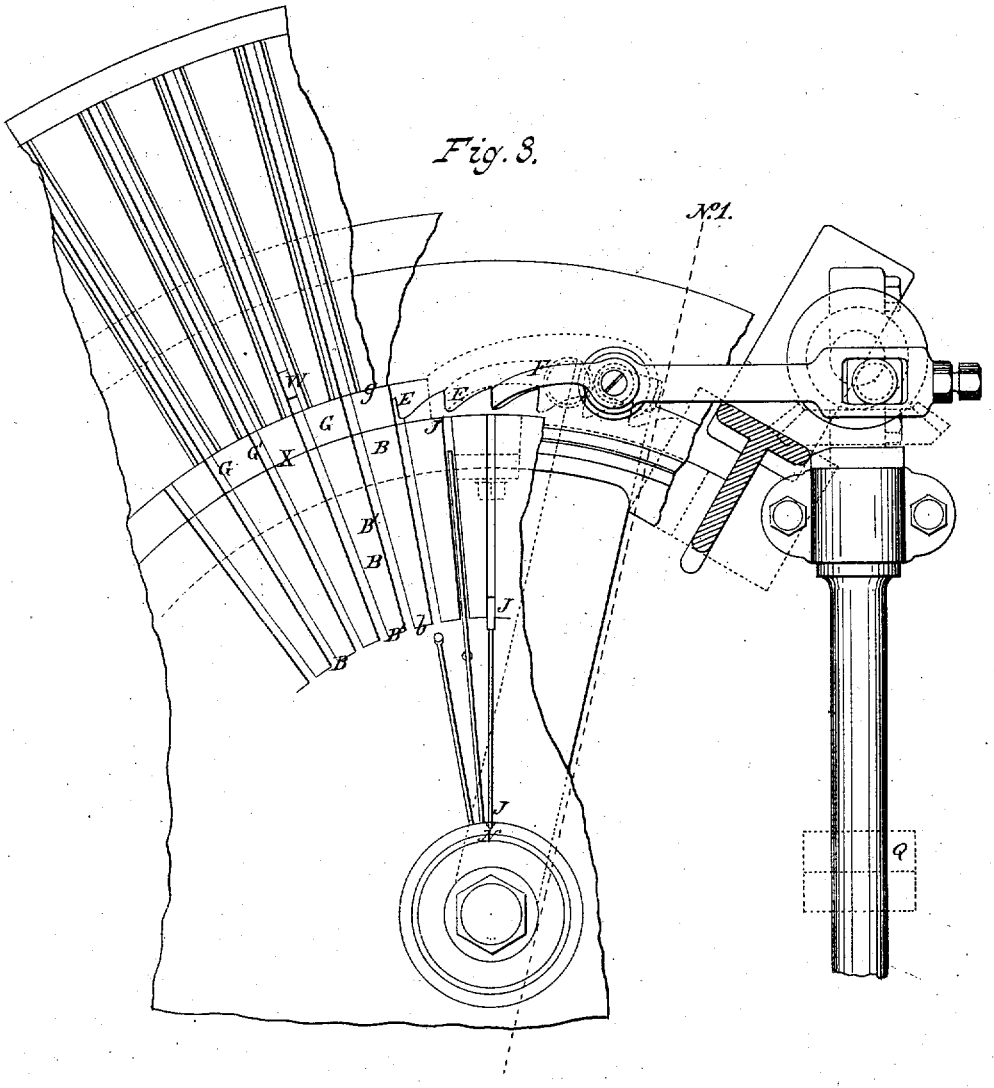
Figure 4:
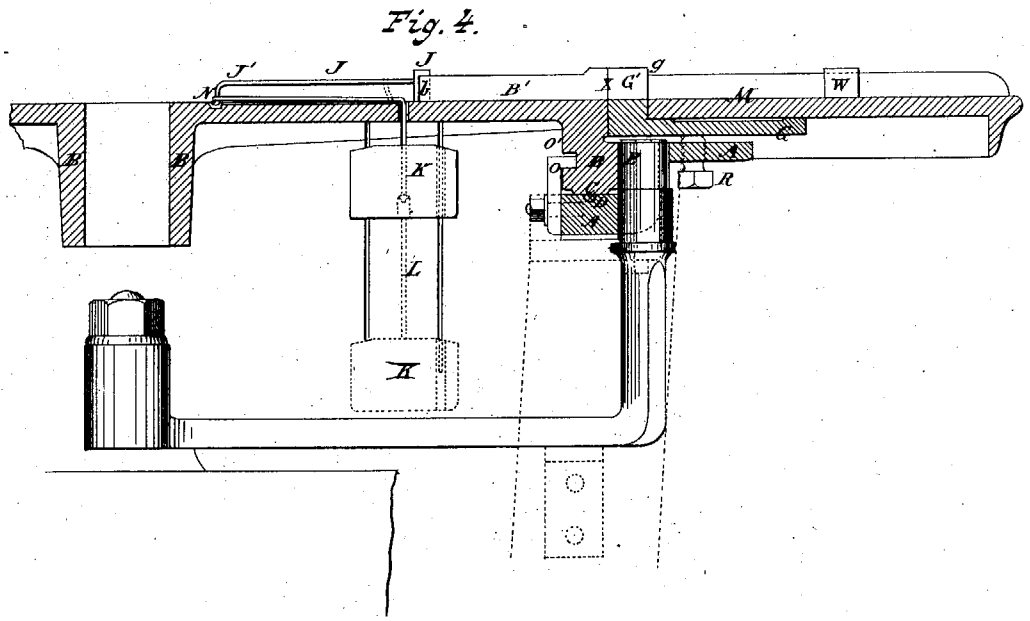
Figure 5:
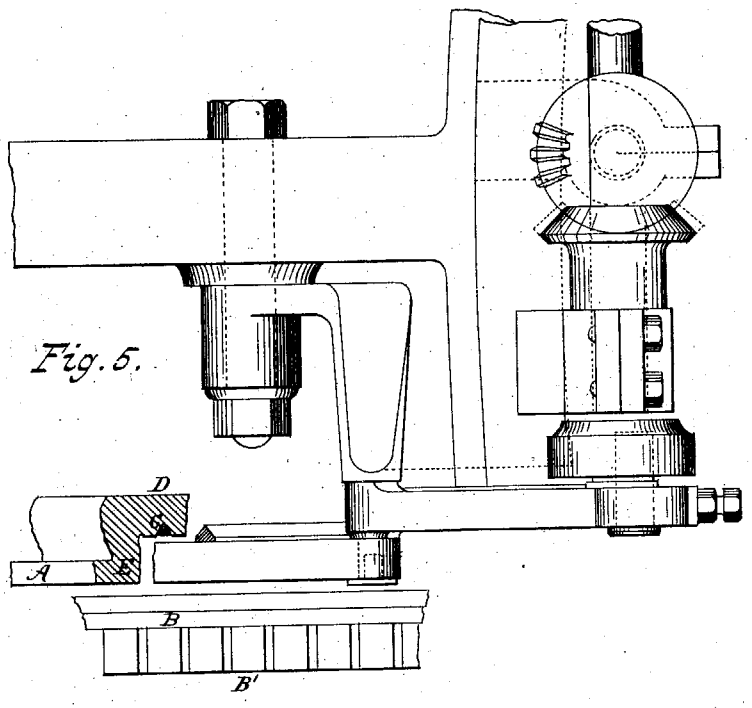

Figure 1 is a perspective view of some of the movable channels and stationary ones opposite thereto. Fig. 2 is a face view of the mouths of the stationary cells at the line X, Fig. 3, showing the fixed pins thereon. Fig. 3 is a plan view of a portion of the machine embodying my improvements. Fig. 4 is a sectional elevation taken at line No. 1, Fig. 3. Fig. 5 is a side elevation of a portion of the machine.

Similar letters refer to similar parts throughout the several views.

On a base, A, preferably of iron, and of circular form, with three legs, I place the circular plate B, supported and revoluble thereon by its V-shaped ring C in the groove D. This plate B has cut on its outer edge the ratchet E, into which engages the pawl F, which, actuated from the pulley Q by suitable intermediate mechanism, imparts a circular equal intermittent movement to the plate B; or such intermittent movement can be given to the plate B by any other known mechanical device. Also, on the base A, surrounding the plate B, I place the plate G, preferably resting on set-screws R, so as to be raised or lowered, and in the plates B and G, extending from *b* to *g*, I cut grooves or channels B′ G′, corresponding to the width of the types of the font to be distributed, with a suitable allowance for their easy movement therethrough, the center lines of all the grooves radiating to the center of the plate B, and the sides of the grooves being parallel. At the dividing-line X, Fig. 3, between the plates B and G, the depth of the groove is about equal to the height of a type, and, the bottoms of all the grooves being in the same plane, the types, a short distance from each side of such dividing-line, will project above the groove, rendering more easy the placing of the types in B′ and their removal from G′. The grooves B′ and G′ are so cut as to match each other on each full separate movement of the plate B, caused by the action of pawl F on the ratchet E. At the mouth of each channel G′, at the line X, I place one or more fixed pins, H, in different positions on each, as shown, Fig. 2, for each different character to be distributed and nicked; but two pins on each channel G′, by the diversity of their positions, will be found sufficient for the distribution of all the characters desired. The channels G′ may be extended to any desirable length by cutting them through the plate M, supported on and fastened to G, as shown, Fig. 4. The channel B′, I make preferably about four inches in length, so as to hold a full line of types from any ordinary column or page, and in each I place the pusher J, actuated by the weight K attached to the cord L, and each pusher can be drawn back and held at rest and inactive by its hooked end J′ resting in the notch N. The plates O, bolted to the base A, with lips *o′* passing into a groove cut in plate B therefor, as shown in Fig. 4, are designed to guard against the lifting of the plate B from any cause whatever. In each channel G′, I place the slugs W, (shown in Fig. 4,) against which the types can bank and be kept on their feet. Should, from carelessness or any cause, any types in the channel B′ not rest on their feet, they may be restored thereto before being presented to G′ by an inclined plate fastened to B, under which they must pass.

The manner in which the several parts of my machine operates is as follows: The operator shoves back a pusher, J, until it is at rest; then lifting a line of types from the column or page to be distributed by the lead between it and the next line, (or, if the matter be solid, by the use of a temporary lead,) he places such line in front of the pusher and releases it so as to act thereon, and repeats this operation until all the channels B′ are filled or the matter to be distributed is exhausted. Motion being communicated by the pulley Q, the plate B revolves with an intermittent movement, and as each channel B′ comes to a channel, G′, it becomes coincident with it and for a short period at rest, and the lines of type in B′ being constantly pressed forward by the pusher J, through the action of the weight K, it follows that when the nicks in the types at the end of the line, or any number of succeeding ones in the same line, correspond to the pins on the connecting coincident channel G′, there being nothing to resist their passage, they instantly pass over thereto, while if the pins and nicks do not agree no action takes place. As the revolution of the plate B need not be over once a minute, its movement is so slow that the filling of the channels B′ can be done whether they are in motion or at rest.

The novelty of this machine consists in its simplicity and the peculiar construction and adjustment of its parts, whereby results can be had never before obtained—viz., the distribution from each channel B′, on each revolution, of one or more different types into their several appropriate receptacles G′, or of several different types—as a word in italics or small caps—into one channel G′, or a number of the same types—as doublets or a line of quads—into one single channel G′, and thence the distribution of a greatly increased variety of characters with fewer channels and of a greater number of types in the same time at the same speed.

While I have hereinbefore described what I consider the most convenient and best form of construction for operation in my machine, I do not intend to be strictly confined thereto, for it may readily be seen that by a slight modification the operation of the machine could be reversed and the same results obtained. Thus the pushers J could be removed from the channels B′ and placed in the channels G′, making them the feeding-channels, and the pins removed from G′ and similarly placed on B′, making the latter the receiving-channel, in this latter case the feeding-channels being stationary and the receiving-channels having an intermittent movement—the reverse of what has hereinbefore been described. Further, the channels B′ could be made stationary and the channels G′ provided with a ratchet, E, and actuated by a pawl, F. In other words, the operation will be the same whether the channels B′ are movable and G′ stationary or the reverse, or whether channels B′ are provided with pushers and G′ with fixed pins or the reverse, provided only the channels into which the lines of types are placed for distribution are provided with pushers, as described, and the channels into which the types are to be distributed into sorts are provided with fixed pins, as described, regardless of the fact whether the one or the other is stationary or movable.

Having described my invention, what I claim, and desire to secure by Letters Patent, is—

1. A series of equidistant stationary channels, in combination with a series of equidistant coincident channels, provided with a ratchet, E, actuated by a pawl, F, or their mechanical equivalents, to give them an intermittent movement, so as to cause them to become *seriatim* and respectively coincident with the others, each of the channels of the series into which the types are to be distributed being provided with fixed pins, and each of the channels in the other series into which the types are to be placed for distribution constructed for and provided with pushers J, having a movement equal to the length of a line of types in any ordinary column or page, and actuated by a weight, K, attached to a cord, L, or their mechanical equivalents, substantially as described.

2. A circular series of equidistant channels, each of a length not less than that of a line of type from any ordinary column or page, in combination with a similar circular coincident series provided with fixed pins and mechanism, substantially as described, to give one series an intermittent movement past the other.

3. A circular series of equidistant channels, each of a length not less than that of a line of type from any ordinary column or page, with pushers therein acting by gravity, in combination with a similar circular coincident series provided with fixed pins and mechanism, substantially as described, to give one series an intermittent movement past the other.

DEXTER REYNOLDS.

Witnesses:
RICHARD P. DUMARY,
CHARLES SELKIRK.